US007500412B1

(12) United States Patent
Maciejewski

(10) Patent No.: US 7,500,412 B1
(45) Date of Patent: Mar. 10, 2009

(54) SPEED NUT AND DRIVE GEAR ASSEMBLY

(75) Inventor: Wendell C. Maciejewski, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 458 days.

(21) Appl. No.: 11/288,060

(22) Filed: Nov. 21, 2005

(51) Int. Cl.
*F16H 1/24* (2006.01)

(52) U.S. Cl. .................. 74/424.71; 81/57.15; 81/57.29

(58) Field of Classification Search ................ 81/57.15, 81/57.29, 58.1; 24/545, 555, 563
See application file for complete search history.

(56) References Cited

U.S. PATENT DOCUMENTS

| | | | | |
|---|---|---|---|---|
| 1,645,570 | A | | 10/1927 | Anderson |
| 1,832,663 | A | | 11/1931 | Small |
| 2,184,733 | A | * | 12/1939 | Burgien ........................ 84/319 |
| 2,475,606 | A | * | 7/1949 | Gagnon ...................... 81/57.29 |
| 2,907,242 | A | * | 10/1959 | Chakroff ................... 81/57.15 |
| 3,435,695 | A | * | 4/1969 | Rivers ...................... 74/412 R |
| 3,532,012 | A | * | 10/1970 | Pryor ........................ 81/57.29 |
| 4,302,136 | A | * | 11/1981 | Abe et al. ................... 411/158 |
| 4,416,561 | A | * | 11/1983 | Fischer .......................... 403/8 |
| 4,685,848 | A | * | 8/1987 | Langer ........................ 411/402 |
| 4,688,961 | A | * | 8/1987 | Shioda et al. ............... 403/389 |
| 4,723,749 | A | * | 2/1988 | Carraro et al. .............. 248/317 |
| 4,788,879 | A | * | 12/1988 | Ulrich ......................... 74/481 |
| 5,331,725 | A | * | 7/1994 | Chou .......................... 24/545 |
| 5,409,339 | A | | 4/1995 | Rosser |
| 5,573,167 | A | * | 11/1996 | Bebb et al. .................. 224/666 |
| 5,639,049 | A | * | 6/1997 | Jennings et al. ............ 248/74.2 |
| 5,642,557 | A | * | 7/1997 | Clews .......................... 24/339 |
| 5,709,685 | A | * | 1/1998 | Dombrowski et al. ....... 606/278 |
| 5,730,541 | A | * | 3/1998 | Duett et al. .................... 403/45 |
| 5,884,372 | A | * | 3/1999 | Anscher et al. ............... 24/339 |
| 2001/0044992 | A1 | * | 11/2001 | Jahrling ....................... 24/563 |
| 2003/0061690 | A1 | * | 4/2003 | Finley et al. .................. 24/336 |

* cited by examiner

*Primary Examiner*—Richard W L Ridley
*Assistant Examiner*—Phillip Johnson
(74) *Attorney, Agent, or Firm*—James M. Kasischke; Michael P. Stanley; Jean-Paul A. Nasser

(57) ABSTRACT

An assembly which includes a rod having an outer peripheral surface. There is also a nut having an axial aperture with an inner peripheral surface moveably engageable with the peripheral surface on the outer peripheral surface of the rod and having a peripheral gear surface. There is also a circular drive gear, which engages the peripheral gear surface of the nut. The circular drive gear is rotatable about its central axis so that the nut is moved along the outer peripheral surface of the cylindrical rod.

2 Claims, 8 Drawing Sheets

SPEED NUT AND DRIVE GEAR ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to lock-threaded fasteners and more particularly to devices for moving a nut along a threaded rod.

(2) Brief Description of the Prior Art

Current techniques used are that of hand-operated tools and motions. Frequently a wrench is used to loosen a locknut or stopnut and then the loose nut is turned by hand to some position along a threaded rod. The purpose of the locknut is to prevent movement of some mechanical device against vibration or other movement. For example, the locknut may be used for alignment or adjustment purposes, such as in varying the height of some components off a platform or base. Once the locknut has been loosened, it must be turned by hand to some other position along the rod. This movement can be over a short or a very long distance depending upon the application. In some instances when adjustments must be made quickly, depending upon the fit of the threads and the cleanliness of the components, it can be a slow and tedious operation.

The prior art discloses a number of devices and methods for moving a nut on a threaded rod and for related functions.

U.S. Pat. No. 1,645,570 to Anderson, for example, discloses a wrench including a mitre gear, a frame and a sleeve provided with a mitre gear. A nut is received in the socket in the sleeve.

U.S. Pat. No. 1,832,663 to Small discloses a wrench including a bevel gear at the end of a shaft and a fork member. A socket member is provided with a bevel gear matching the bevel gear.

U.S. Pat. No. 4,685,848 to Langer discloses a rotatable fastener, which has a head portion with an axially facing ring gear engageable with a complementary gear of a drive tool. The ring gear is a rearwardly facing beveled gear for use with a beveled drive gear and the head portion defines a forwardly directed thrust surface engageable by a bearing surface of the drive tool to urge the drive gear against the ring gear.

U.S. Pat. No. 2,907,242 to Chakroff discloses an arrangement comprising a nut with a bevel gear and a power driver including matching bevel pinion and a supporting yoke.

U.S. Pat. No. 5,409,339 to Rosser discloses two teethed nuts which are meshed together in an arrangement that causes both the nuts to move at the same rate of speed and in the same direction up or down the threaded rod arms of a U-bolt clamp whenever one of the nuts is turned. The meshed nuts apply similar and simultaneous pressure upon the crosspiece of a U-bolt clamp which crosspiece moves relative to the threaded rod arms which transverse it through apertures in the crosspiece. A clamping force is achieved between the crosspiece and the curved portion of the U-bolt as the two members are forced together by movement of the meshing nuts turning upon the threaded rod arms and pressing against the crosspiece.

A need, however, still exists for a quicker and easier means for moving a nut along a threaded rod.

SUMMARY OF THE INVENTION

It is an object of the present invention to provide a means for allowing rapid movement of a stopnut or locknut along a threaded rod.

The present invention is a device that replaces hand turning of the nut to move along a threaded rod to allow for adjustment of some other mechanical devices. Once the position of the mechanical device is established, it provides a means for rapidly advancing the locknut or stopnut back into a position where it can be tightened by a wrench or other means.

The apparatus of the present invention consists of two subassemblies, which are a speed nut and a driver. The speed nut is used to take the place of a conventional locknut or stopnut. This speed nut consists of a standard hex nut with a pinion bevel gear attached to it. The nut is sized according to the particular application and thread as in normal engineering practice. The bevel gear is selected as part of a gear set. Generally, a gear set consists of a pinion and a drive gear. Selection of the gear set is dependent upon two considerations; size and gear ratio. The gears must be sized to fit the intended application. Their physical size must be such that they do not interfere with any other components. The ratio is selected such that the rate of travel of the speed nut is acceptable to the operator. The transmitted speed of an electric drill or portable drill is increased or decreased depending upon the gear ratio.

For the speed nut, the pinion is selected such that it can be rigidly attached to one side of the hex nut. The gear teeth must freely extend beyond the diameter of the nut. It is desired to select or machine the hub of the gear such that they could be welded together. A circular groove is machined in the hub of the gear to accept the fingers of 2 guides. The hole in the gear can be machined in one of two manners. It could be left as a clearance hole for the particular thread or it could be threaded to increase the contact area of the locknut. The idea of rigidly connecting the components is so that when one moves, the other follows with no time lag; and the two components have become one part.

The second component of this invention is the driver subassembly. This subassembly is the tool that is attached to the speed nut to make the adjustments. It provides a means of holding the drive gear in mesh with the pinion during operation. This driver assembly is made of the matching bevel drive gear from a gear set that had the pinion as described previously. The drive gear is modified by a threaded hole with a shoulder through the center hole, which provides a positive stop for 2 button head screws and prevent the base of the head of the screw from bottoming against the face of the gear. Thus there is a clearance for 2 spring clips such that it cannot bind the spring clip, which will be free to rotate.

A shaft is mounted into the gear with a moderate press fit and locked with a cross pin. This shaft is sized such that it can be fit into an appropriate drill chuck. The apparatus also may include a spring clip, which attaches to the face of the bevel gear with a button head screw such that it is free to rotate about the screw. This spring clip will spring open to nest and hold onto the threaded rod, which keeps the drive gear in mesh with the speed nut pinion gear while also allowing the speed nut assembly to travel along the threaded rod. There is also a small clearance between the head of the screw and the spring clip such that when the screw is bottomed out and tight, the clip is free to rotate about the screw.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts in the drawing and wherein.

DETAILED DESCRIPTION OF THE PREFERRED EMBODIMENT

Figure 1B:
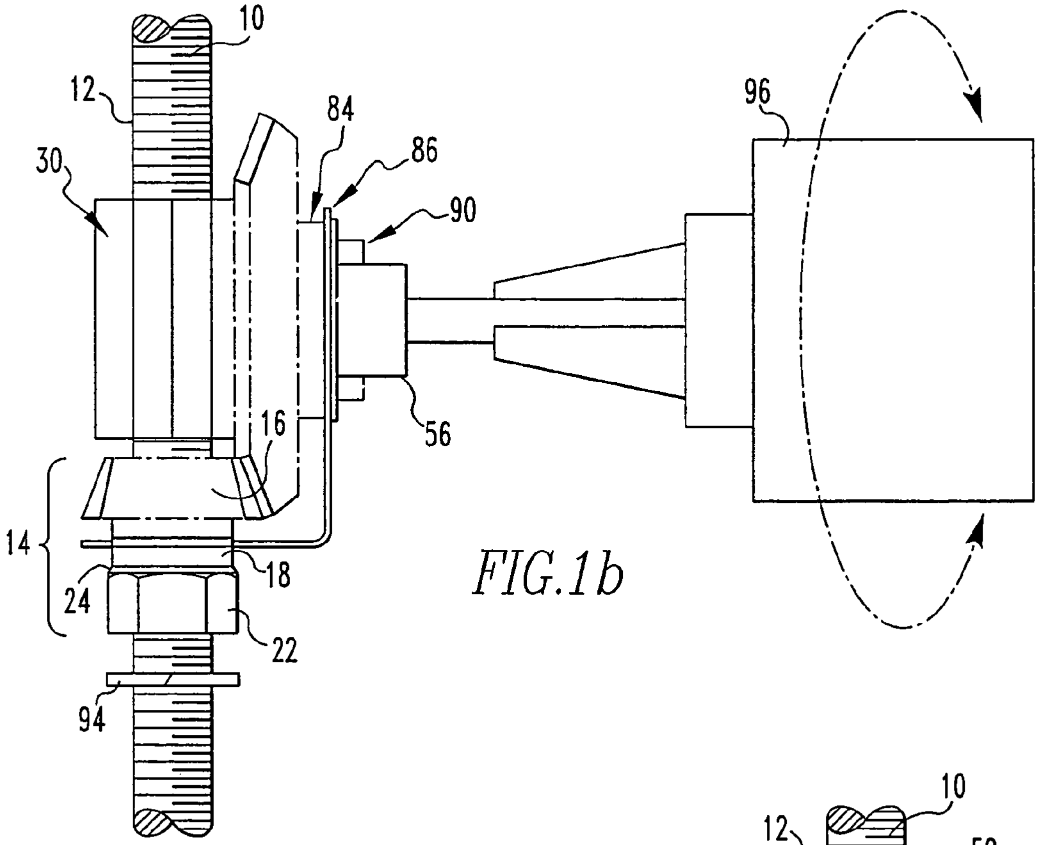
FIG. 1*b* is another side elevational view of the assembly shown in FIG. 1*a* viewed normally to the axis of the driver subassembly.

Referring to FIGS. 1*a*-1*b* and 2*a*-2*c*, the assembly of the present invention includes a cylindrical rod 10. A helical thread 12 (or any other suitable threading arrangement known to those skilled in the art) can be applied to the outer peripheral surface of the cylindrical rod 10. The assembly also includes a speed nut 14 which has a pinion bevel gear 16 superimposed on a cylindrical gear base 18. This cylindrical gear base 18 also includes a guide groove 20. The pinion bevel gear 16 and cylindrical gear base 18 are superimposed on a hex nut 22. The cylindrical gear base 18 is attached to the hex nut 22 by means of weld 24. A central axial aperture 26 extends downwardly through the pinion bevel gear 16, cylindrical gear base 18 and hex nut 22. The axial aperture 26 inside the hex nut 22 is provided with threads, or a helical groove 28.

Referring particularly to FIGS. 1*a*-1*b* and FIGS. 3*a*-4*b*, the assembly also includes a clip 30. This clip 30 includes front edges 32 and 34, that are angularly disposed to each other to intersect at apex 36. Clip 30 also includes opposed lateral sides 38 and 40, that have respectively bosses 42 and 44. At the ends of lateral sides 38 and 40 there are respectively attachment features 46 (FIGS. 4*a*-4*b*) and 48 (FIGS. 4*a*-4*b*), that allow clip 30 to be fastened to the cylindrical rod 10 in the way shown in FIGS. 1*a* and 1*b*.

Referring particularly to FIGS. 1*a*-1*b* and FIGS. 5*a*-5*c*, the drive gear 50 includes a beveled gear 52, which extends peripherally from an upper planar section 54. The drive gear 50 also includes a cylindrical hub 56 with a threaded aperture 58, a shoulder 60 and a smooth axial aperture 62. There is also a transverse aperture 64 in the cylindrical hub 56 in opposed relation to the upper planer surface 54 there is a lower planar surface 66 and an oblique surface 68, which extends peripherally from this lower planar surface 66.

Referring to FIGS. 1*a*-1*b* and FIGS. 6*a*-6*c*, a guide 70 is included in the assembly which has a front section 72 with a front generally semicircular cut away section 74 and opposed fingers 76 and 78. Guide 70 also includes longitudinal section 80 with a circular cut-away section 82, which is large enough to allow the hub 56 to pass through. The function of guide 70 is shown in greater detail below.

Referring to FIGS. 1*a*-1*b* and FIGS. 7*a*-7*c*, the drive gear 50 is superimposed over the clip 30. On the upper side of drive gear 50 there is a spacer 84 on which the longitudinal section 80 of the guide 70 is superimposed. There is also a washer 86 and a drive shaft 88 that extends through the entire assembly, and a cross pin 90 is positioned in the transverse aperture 64 of the drive gear 50 to lock the entire assembly together. The guide 70 fits over the drive hub 56 and is free to rotate about the drive shaft 88. The fingers 76 and 78 fit freely around the grove 20, and the fingers 76 and 78 act as a follower to the speed nut 14 and guide the user to maintain proper position of the drive assembly. There is a spacer between the guide 70 and the back of the drive gear 50 to help prevent damage to the components and to prevent binding between the two. The washer 86 installed over the hub 56 after the guide prevents damage to the guide from the cross pin 90. Although both the washer 86 and the spacer 89 are to be low friction materials, it is not necessary that they be metal.

On the opposed side a button head screw 92 locks the assembly together from that side.

Figure 1C:
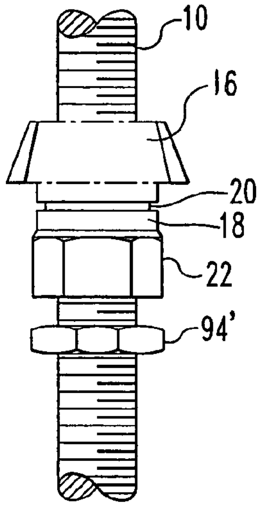
FIG. 1*c* is a side elevational view like that of a portion of the assembly in FIG. 1*b*, which illustrates a modification of structure.
Figure 1A:
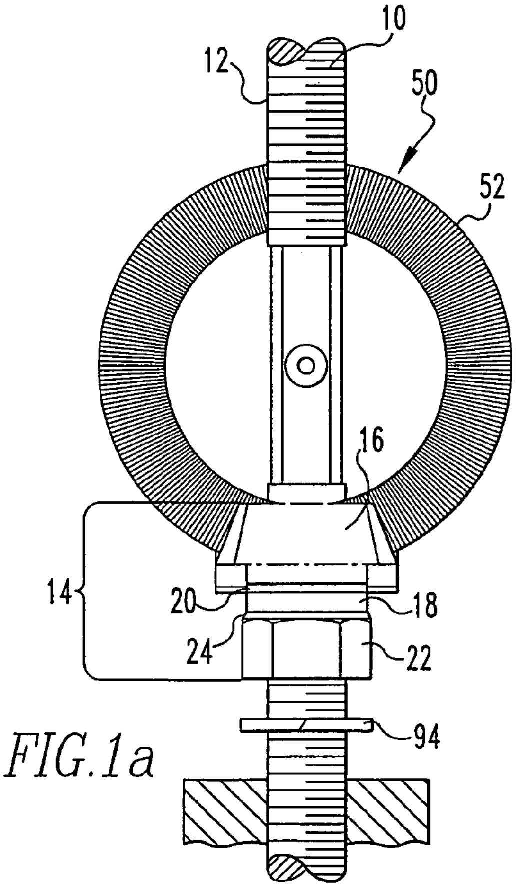
FIG. 1*a* is a side elevational view of a preferred embodiment of the assembly of the present invention providing a view directly along the axis of the driver subassembly.
Figure 2B:
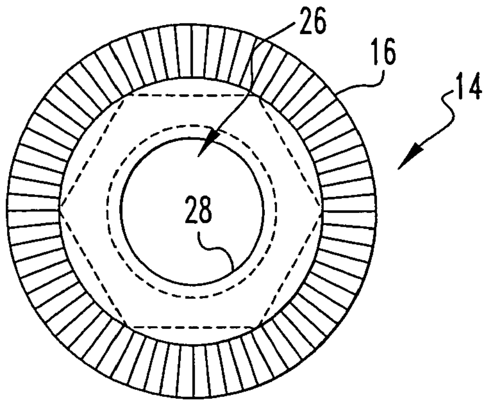
FIG. 2*b* is a top plan view of the speed nut shown in FIG. 2*a;*
Figure 2A:
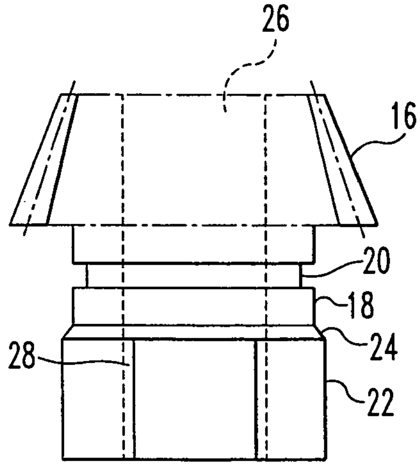
FIG. 2*a* is a side elevational view of the speed nut element of the assembly shown in FIG. 1*a;*
Figure 2C:
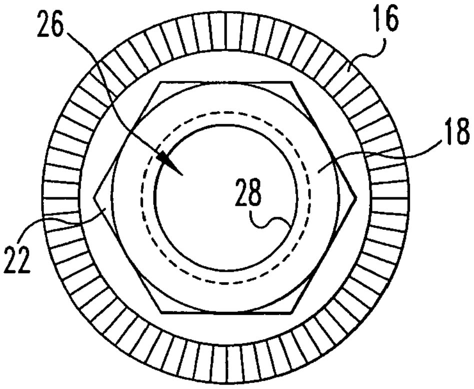
FIG. 2*c* is a bottom plan view of the speed nut shown in FIG. 2*a;*
Figure 3A:
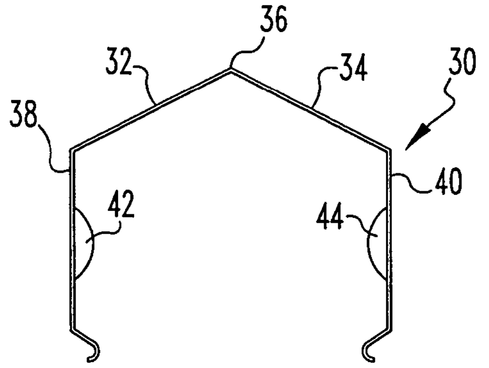
FIG. 3*a* is an end view of the nut clip element of the assembly shown in FIG. 1*a;*
Figure 3B:
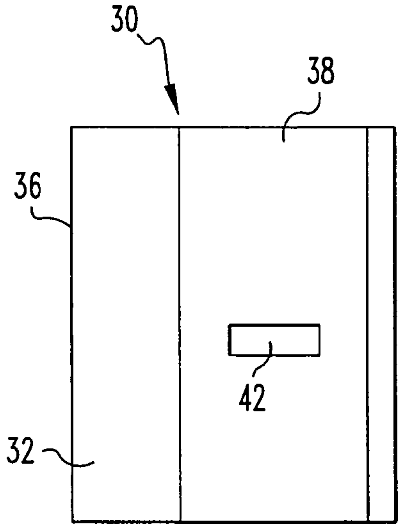
FIG. 3*b* is a side view of the nut clip element shown in FIG. 3*a;*
Figure 3C:
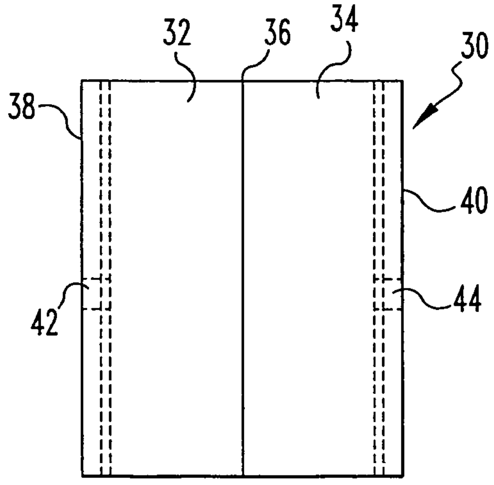
FIG. 3*c* is a bottom plan view of the nut clip shown in FIG. 3*a;*
Figure 4B:
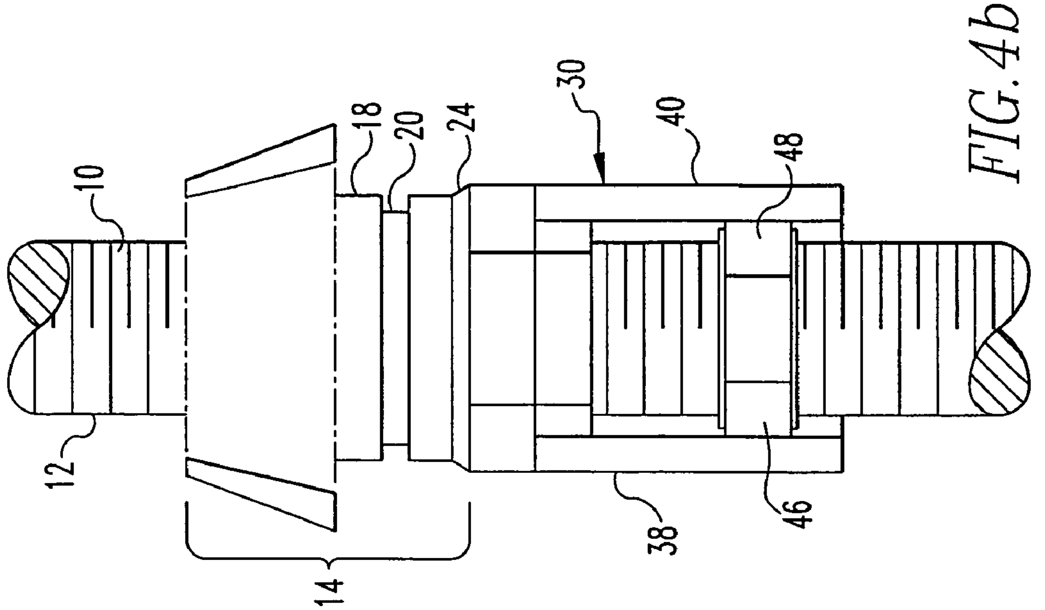
FIG. 4*b* is another side elevational view of the nut clip mounted on the cylindrical rod shown in FIG. 4*a* with the view rotated 90° about the rod axis.
Figure 4A:
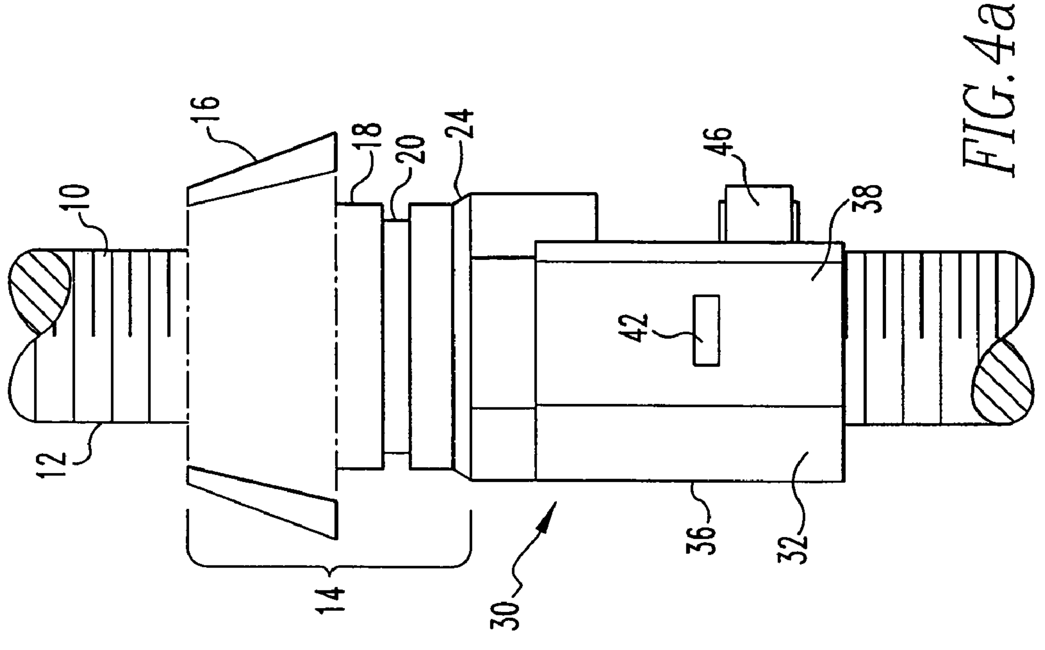
FIG. 4*a* is a side elevational view of the nut clip mounted on the cylindrical rod shown in FIG. 1*a;*
Figure 5C:
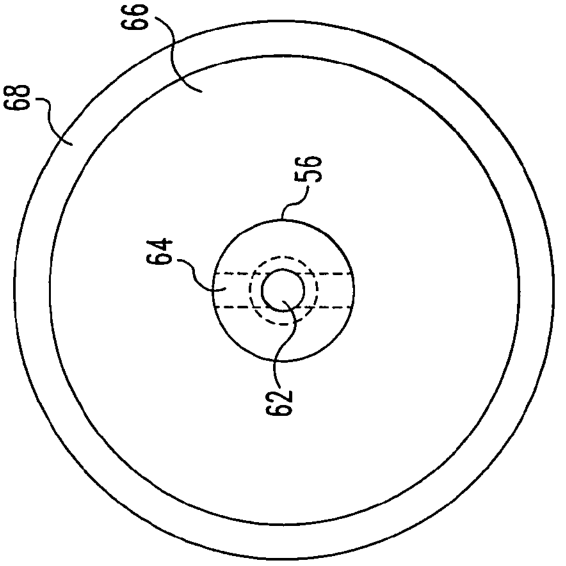
FIG. 5*c* is a bottom plan view of the drive gear shown in FIG. 5*a;*
Figure 5B:
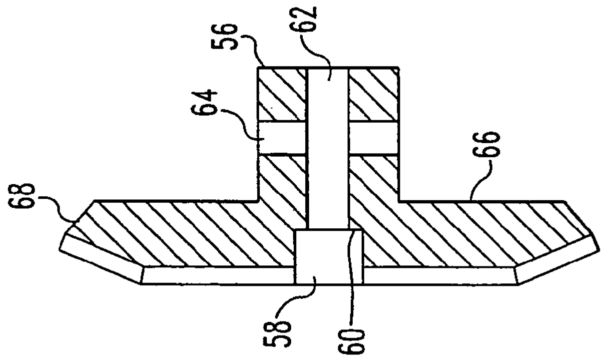
FIG. 5*b* is a cross section through 5*b*-5*b* in shown in FIG. 5*a;*
Figure 5A:
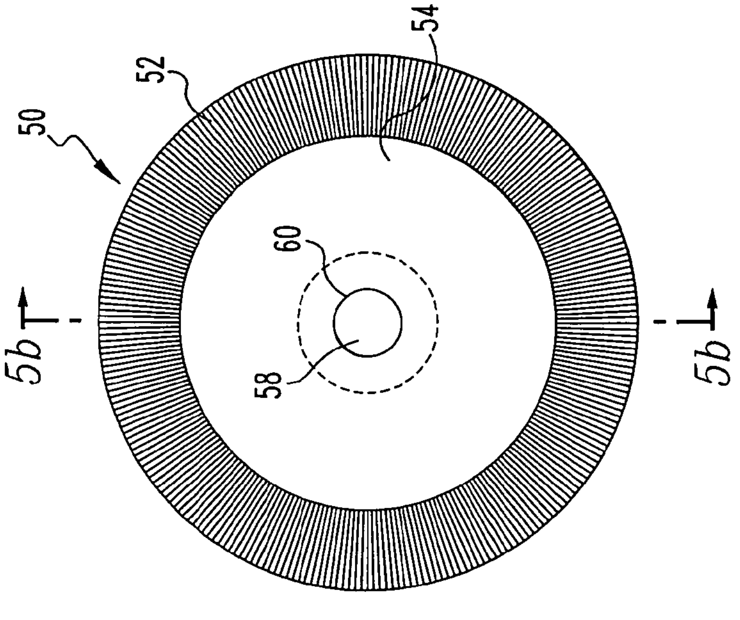
FIG. 5*a* is a top plan view of the drive gear used in the assembly shown in FIG. 1*a;*
Figure 6A:
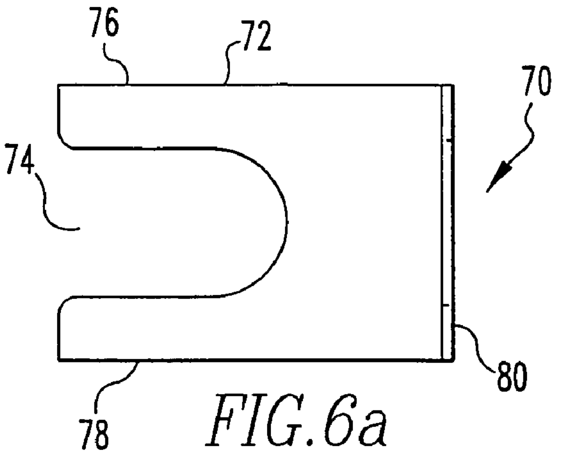
FIG. 6*a* is a front elevational view of the guide element used in the assembly shown in FIG. 1*a;*
Figure 6B:
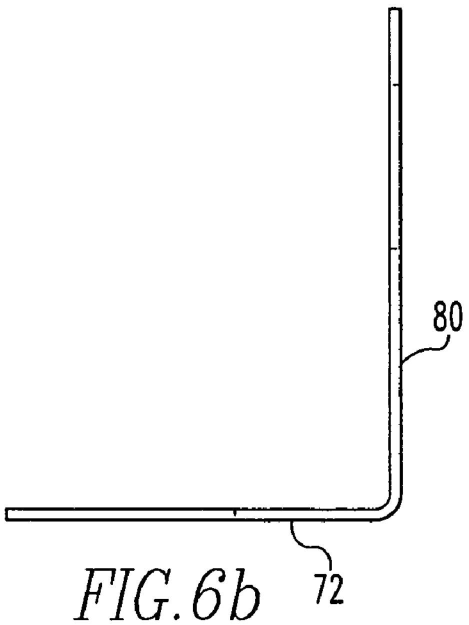
FIG. 6*b* is a side view of the of the guide element shown in FIG. 6*a;*
Figure 6C:
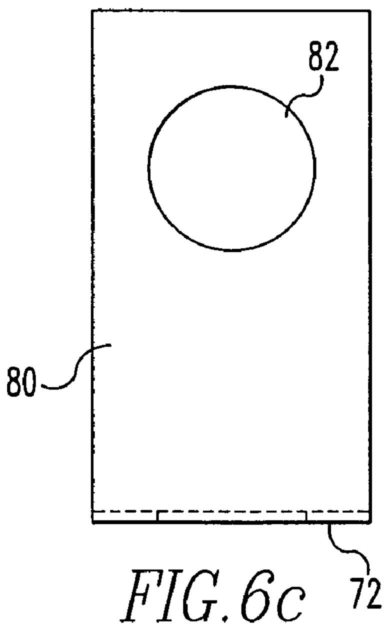
FIG. 6*c* is a top plan view of the guide element shown in FIG. 6*a;*
Figure 7C:
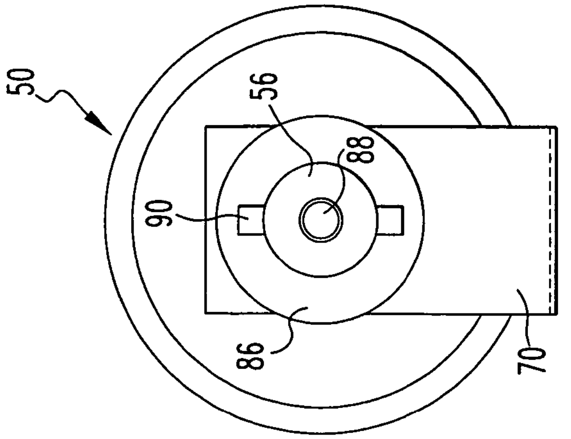
FIG. 7*c* is a top plan view of the driver subassembly shown in FIG. 7*a;*
Figure 7B:
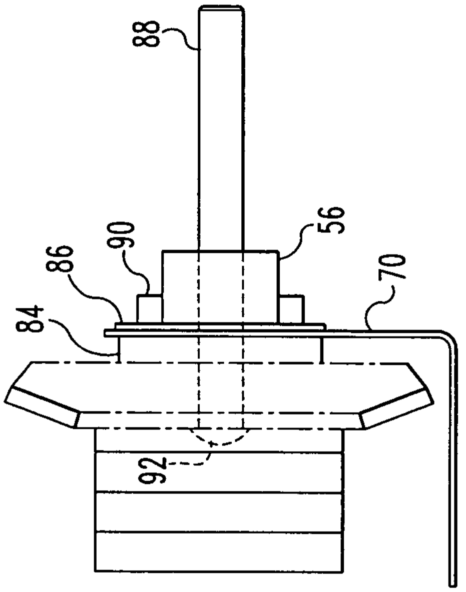
FIG. 7*b* is a side elevational view of the driver subassembly shown in FIG. 7*a;*
Figure 7A:
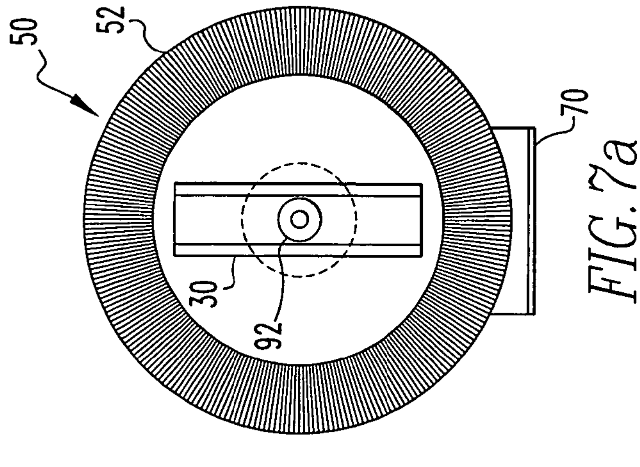
FIG. 7*a* is a bottom plan view of the driver subassembly used in the assembly shown in FIG. 1*a;*

Referring particularly again to FIGS. 1*a*-1*b*, the assembly may also include a lock washer 94. A drill chuck 96 on an electric drill (not shown) engages the drive shell 88 to rotate the drive shell 88 about its longitudinal axis and thereby rotate the drive gear 50 to in turn engage the speed nut 14 on the threaded cylindrical rod 10. Referring to FIG. 1*c*, a locknut 94' may be used instead of a lockwasher on the threaded cylindrical rod 10. Similar, since the assembly of the present invention acts as a locknut, one assembly may be used in conjunction with another to act as locknuts against each other.

In the operation of the apparatus of this invention, the speed nut 14 is attached to the threaded rod 10, for example, to act as a locknut to some device. It is installed with the bevel gear 16 away from the device being locked. This allows for free access of the drive shaft 88 to the gear teeth. The drive assembly is installed into an electric or portable hand drill by inserting the drive shaft 88 into the drill chuck 96 and locking it in place. The fingers 76 and 78 of the guide 70 are slipped around the groove 20 in the cylindrical base 18 of the speed nut 14 and the spring clip 30 is pushed against the threaded rod 10 until secure. At this point, the teeth of bevel gears 16 and 52 should be meshed together. When the trigger (not shown) of the drill is pressed, the drive gear 50 will rotate, thereby causing the pinion bevel gear 16 to rotate as well. The direction of rotation is dependent on that set by the operator and the drill. While the drill, for the most part, is held in position by the operator's hand, the spring clip 30 and guide 70 help maintain the perpendicularity needed between the gear teeth as well as the necessary contact to drive properly. As the speed nut 14 changes position along the threaded rod 10, the guide 70 follows it by guiding the drive assembly. The spring clip 70 allows the assembly to slide along the threaded rod 10 to maintain its position and maximize its effectiveness. When the speed nut 14 is in position to be locked, a conventional wrench (not shown) can be applied to the hex nut 22 for final torquing.

Figure 8B:
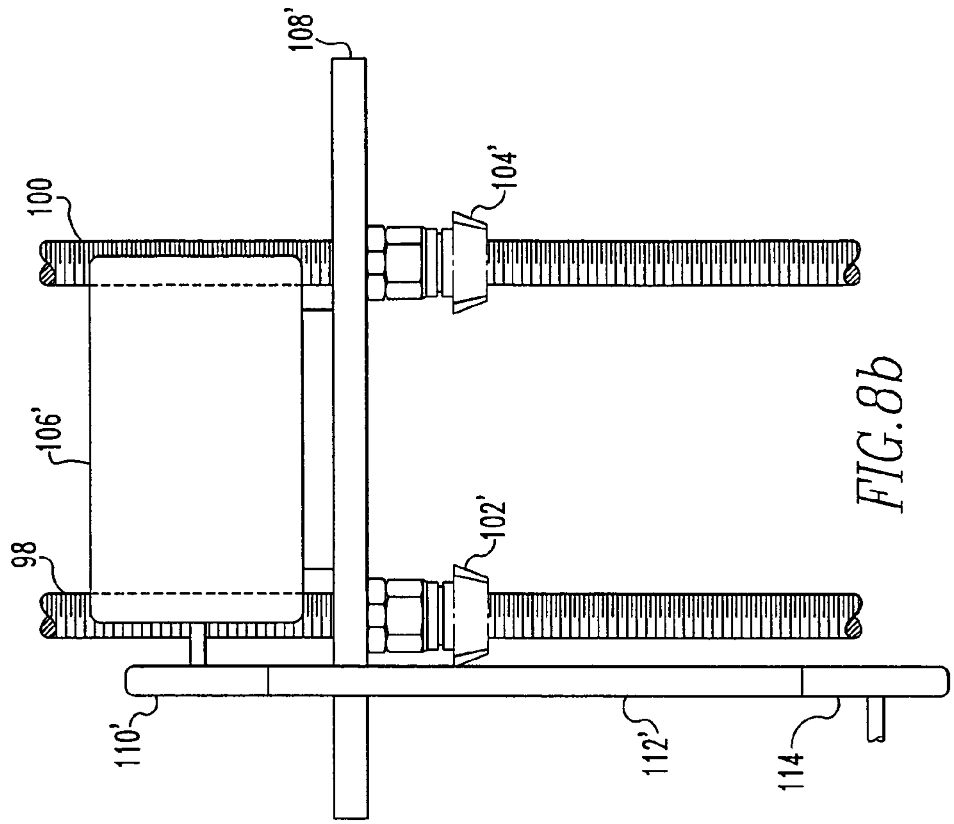
FIG. 8*b* is another side elevational view of the application shown in FIG. 8*a* in an adjusted position.
Figure 8A:
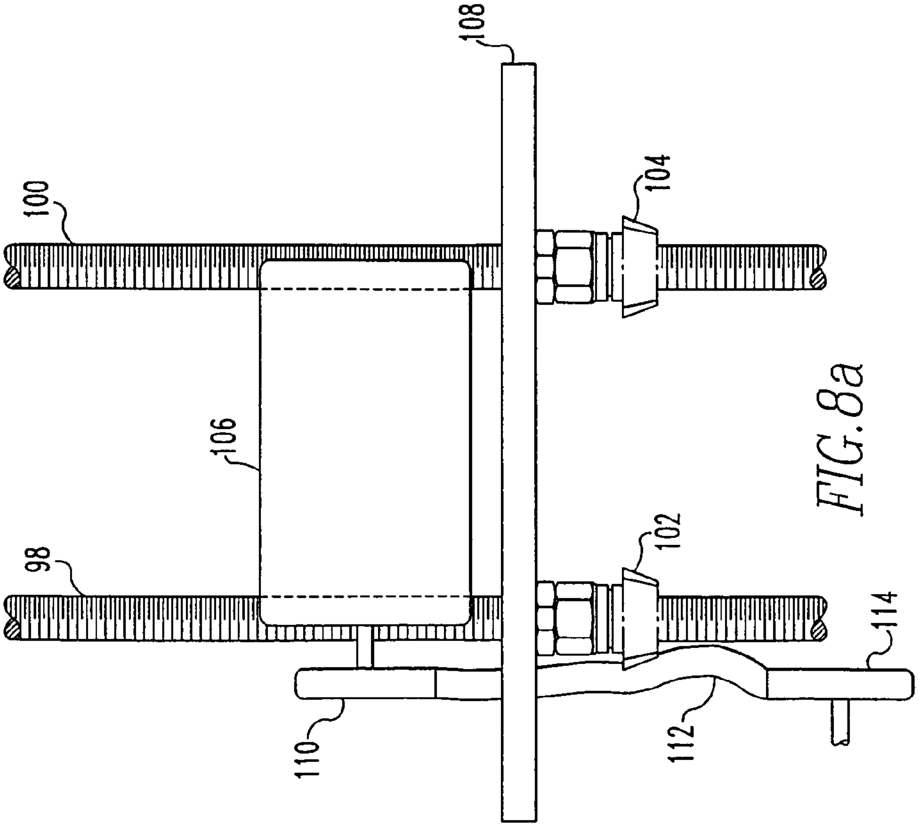
FIG. 8*a* is a side elevational view of an application making use of a preferred embodiment of the speed nut of the present invention.

Referring to FIGS. 8*a*-8*b* an application for the speed nut assembly of the present invention is illustrated. In this application, parallel cylindrical rods 98 and 100 are equipped with speed nut assemblies 104 and 106 as were described above. Electric motor 108 is superimposed on a mounting platform 110, which is also supported by the cylindrical rods 98 and 100. The electric motor 108 drives a pulley 110, which is connected by a belt 112 to a driven pulley 114. In the arrangement shown in FIG. 9*a*, the belt 112 is loose. In order to tighten the belt, the speed nut assemblies 104 and 106 are moved upwardly in the way hereinabove described on the cylinders 98 and 100 respectively so as to elevate the mounting platform to its position 108' where the final positions of the speed nuts 102' and 104' are shown in FIG. 8*b*. As a result of this movement, the belt 112 is tightened as is shown in FIG. 8*b*.

Those skilled in the art will appreciate that a range of materials may be used for the various components described above. It is generally expected that such materials will be metals, although nonmetals may also be used. The pinion gear can be attached to the locknut in many different fashions, pins, welding, tongue and grooves, or keys to name a few. The type of application for which this invention is used will drive these choices. The hub of the pinion gear can also be modified to match the shape of the hex nut. This would provide more gripping surface for a wrench.

It will be appreciated by those skilled in the art that the shape of the spring-clip could readily be modified while the same function could be performed. The particular design disclosed is believed to ensure substantial stability to the driver as it moved along the threaded rod. The means for attaching the spring-clip to the driver may also be modified in a number of ways. For example, attachment could be accomplished by means of rivets in addition to the screws disclosed. Components of the driver assembly can be easily changed to suit different size applications. The button head screw can be removed with a standard Allen wrench to change spring clips. The hub of the drive gear could be modified to accept a nut or set screw, which would allow the guide to be removed from the assembly to change it for a different size. The guide could be modified to allow the fingers to spring open and close to maintain a grip on the speed nut.

It will be appreciated that a major advantage of this invention over conventional methods is that it speeds up the operation of repositioning a locknut over long distances for adjustment purposes. This in turn will drastically shorten the time required to make such adjustments. Devices of this type will find wide use in packaging machines and mechanical test devices where adjustments are required.

Another advantage of the apparatus of the present invention is that it allows for use in a conventional electric drill.

Another major advantage is that the invention is small and can be easily standardized for an application or an industry. Components can easily be interchanged on the driver to accommodate different size threaded rods if required.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An assembly of comprising:

a cylindrical rod having an outer and threaded peripheral surface; and a subassembly comprising:

a nut having an axial aperture with a threaded inner peripheral surface moveably engageable with the peripheral surface on the outer peripheral surface of said rod and having a peripheral gear surface;

a generally circular drive gear engaging the peripheral gear surface of said nut and having a central axis; and a means for rotating said generally circular drive gear about the central axis, whereby said nut is moved along the outer peripheral surface of said rod;

wherein said peripheral gear surface of said nut is beveled;

wherein said peripheral gear is superimposed on a base cylindrical member having a peripheral groove;

wherein said generally circular drive gear has an axial aperture;

wherein a drive shaft extends through the axial aperture of said generally circular drive gear;

wherein there is a guide member having a top leg with an aperture and an end leg with parallel terminal fingers which is superimposed over said drive gear so that said drive shaft extends through the aperture in said top leg and said fingers in said end log engage the groove in said cylindrical gear base;

wherein a clip spring engages said rod.

2. The assembly of claim 1 wherein said clip spring is secured to said drive gear by a button head screw.

* * * * *